June 20, 1961  J. L. RAMM  2,989,306
SHINGLE FEEDING APPARATUS
Filed Jan. 2, 1958  10 Sheets-Sheet 1

INVENTOR
JOSEPH L. RAMM
BY
John W. McKinney
ATTORNEY

Fig.5.

INVENTOR
JOSEPH L. RAMM
BY
John A. McKinney
ATTORNEY

June 20, 1961

J. L. RAMM

2,989,306

SHINGLE FEEDING APPARATUS

Filed Jan. 2, 1958

INVENTOR
JOSEPH L. RAMM

BY
John A. McKinley
ATTORNEY

Fig. 11.

INVENTOR
JOSEPH L. RAMM

United States Patent Office 2,989,306
Patented June 20, 1961

2,989,306
SHINGLE FEEDING APPARATUS
Joseph L. Ramm, Metairie, La., assignor to Johns-Manville Corporation, New York, N.Y., a corporation of New York
Filed Jan. 2, 1958, Ser. No. 706,650
11 Claims. (Cl. 271—5)

This invention relates to apparatus for feeding sheets, such as asbestos cement shingles, to a machine for the performance of operations thereon. The feeder automatically takes a stack of shingles that are placed on a loading platform and through a series of processes moves them to a position where each single is separately fed to a punch press which then performs its customary operation. Means are provided within the feeder so that successive stacks of shingles may be delivered without interrupting the feeding of shingles to the punch press.

It is the primary object of this invention to provide apparatus for automatically and successively feeding the top one of a stack of sheets to a punch press.

It is a further object of this invention to provide apparatus for automatically and successively feeding the top one of a stack of shingles to a punch press wherein the stack is automatically replenished without interruption of the feeding operation.

The invention will be more fully understood and further objects and advantages thereof will become apparent when reference is made to the following detailed description of a preferred embodiment of the invention and the accompanying drawings in which.

General construction

The shingle feeding apparatus is supported by four vertical I-beams 10 that are fastened to the building floor adjacent the corners of a pit 11 which houses operating mechanisms of the apparatus and is covered by the plate 12. The I-beams are connected throughout their length by other beams which form supports for different parts of the apparatus. At the top, the front two I-beams are secured to and support the housing 13 for the vacuum feeding means. The two rear I-beams 10 are joined by another I-beam 14 that supports the belt conveyor means 15 for feeding shingles to the punch press (not shown).

Charging table

Figures 1, 2, 3:
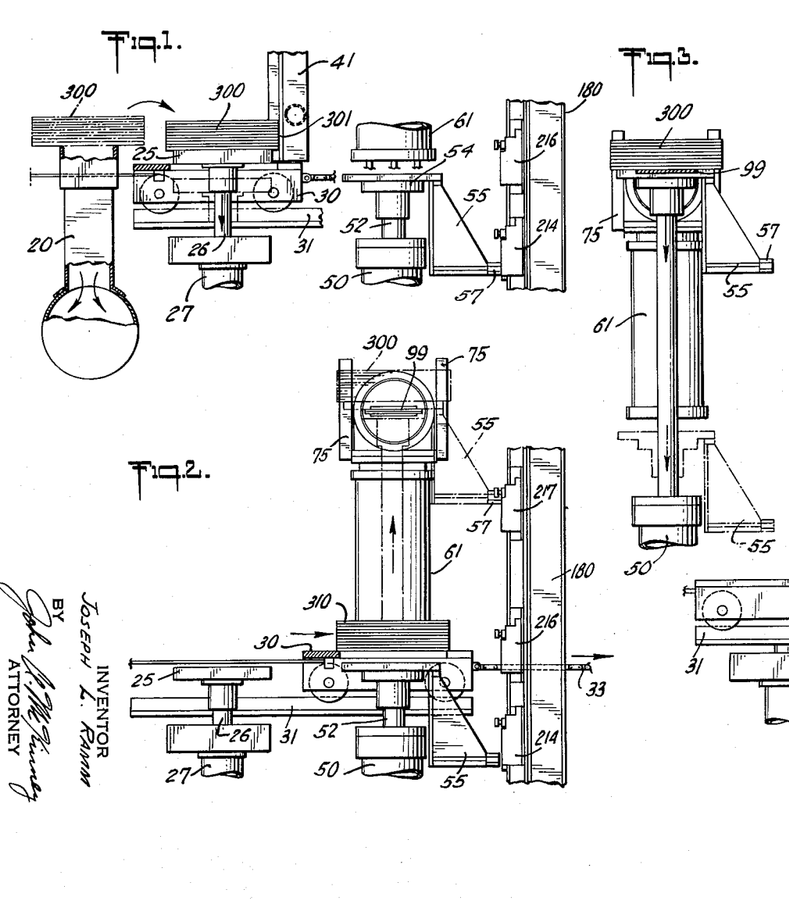
FIGS. 1-4 are a diagrammatic showing of the passage of the shingles from the feed hopper to the punch press.
Figure 4:
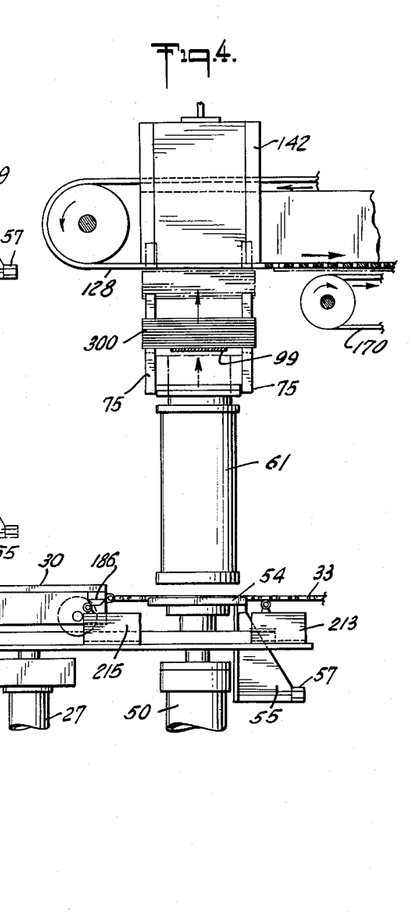
Figure 5:
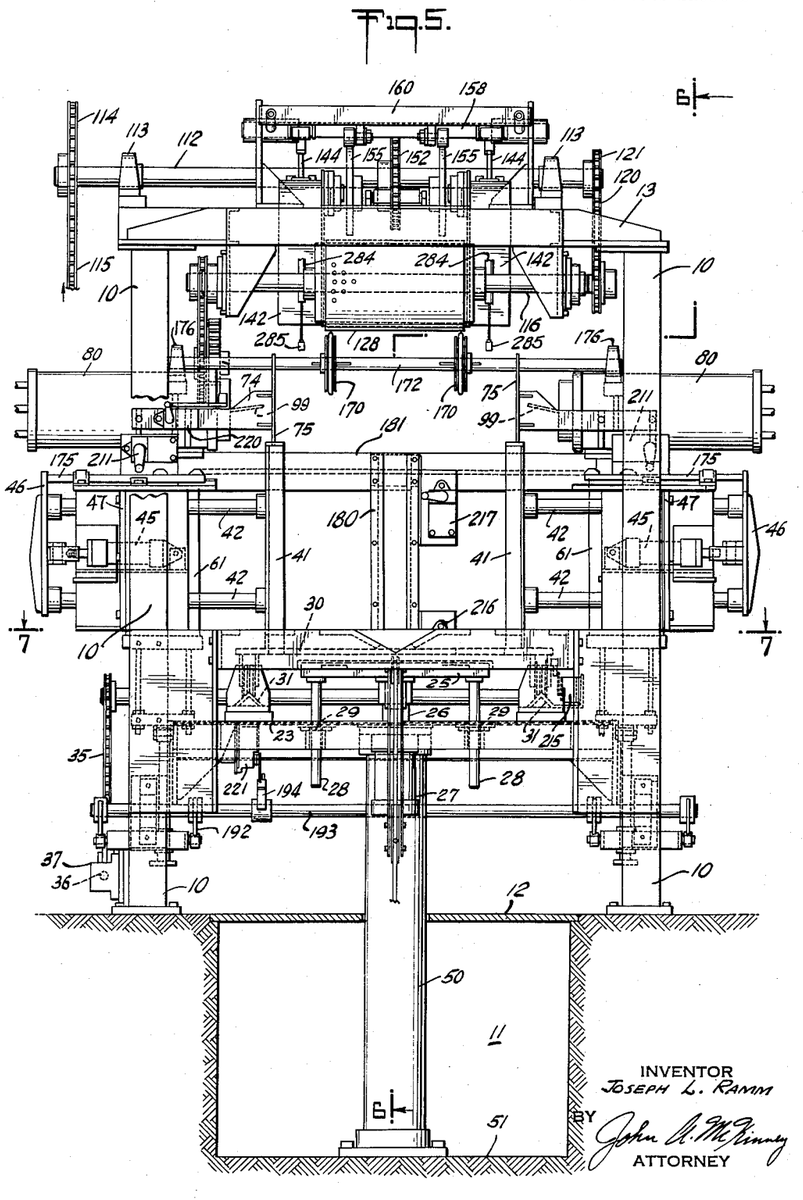
FIG. 5 is a front elevation of the feeding apparatus.
Figure 6:
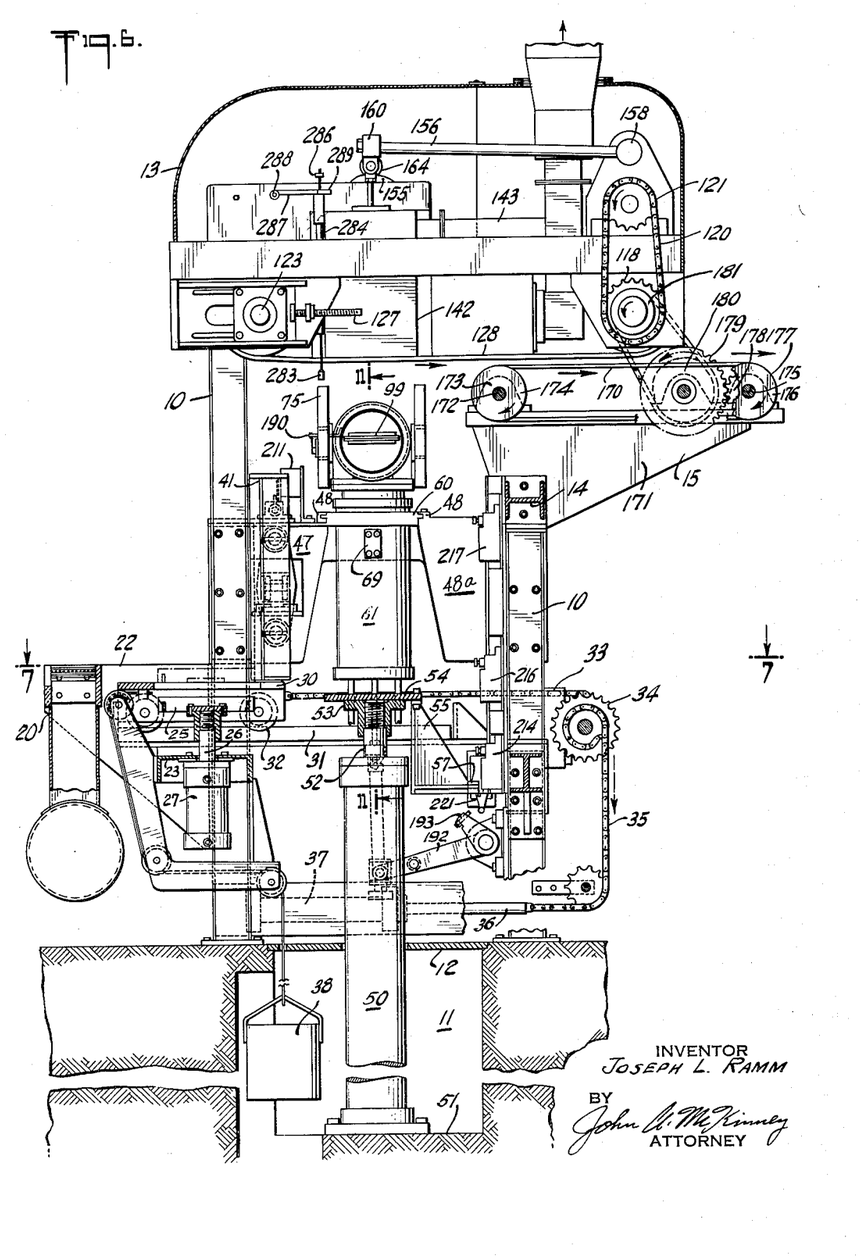
FIG. 6 is a section taken on a plane passing through the line 6—6 of FIG. 5.
Figure 7:
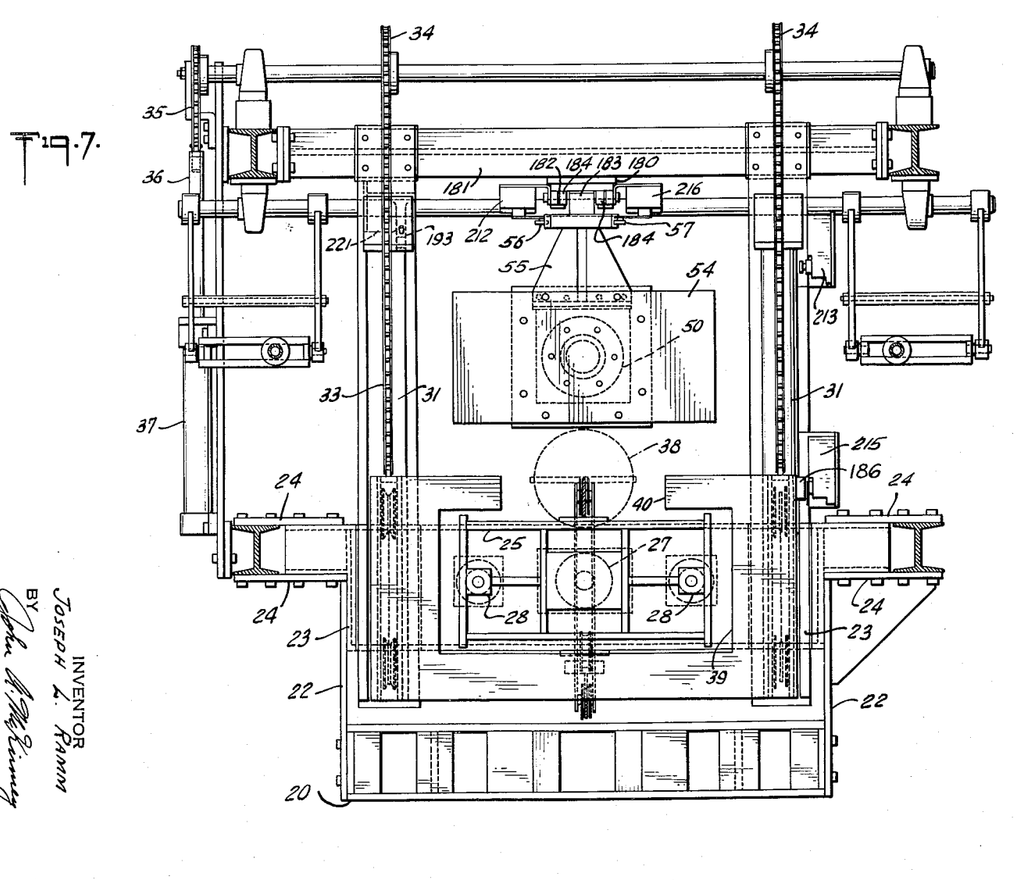
FIG. 7 is a top plan view of the lower portion of the apparatus from a plane passing through line 7—7 of FIG. 6.

As viewed in FIGS. 5-7, the charging table consists of a feed hopper 20 on which the shingles are deposited from the pallet. The hopper 20 is mounted on the I-beams 10 by pair of plates 22 which extend outwardly from a platform 23 bolted to the I-beams 10 through the support plates 24. A stacking frame 25 is supported for vertical movement on the piston 26 of the charging table cylinder 27 which is secured to the platform 23. A pair of guide rods 28, secured to the frame 25 and moving through bushings 29 attached to the platform 23, contain the movement of the frame 25 to a vertical direction.

Another section of the charging table is the shingle carriage 30 which moves over the rails 31 on the rollers 32. A driving chain 33, attached to one end of the carriage 30, is trained over a sprocket 34 which is rotated by another drive chain 35 secured to the piston 36 of the carriage cylinder 37. The normal position of the carriage 30 is indicated in FIG. 6 wherein the counterweight 38 acting over a train of pulleys holds the piston 36 in the out position. The carriage proper has a rectangular opening 39, through which moves the stacking frame 25. One end wall 40 of the carriage 30 is cut away to form an inlet and outlet for a purpose to be later described.

Figures 8, 9, 10:
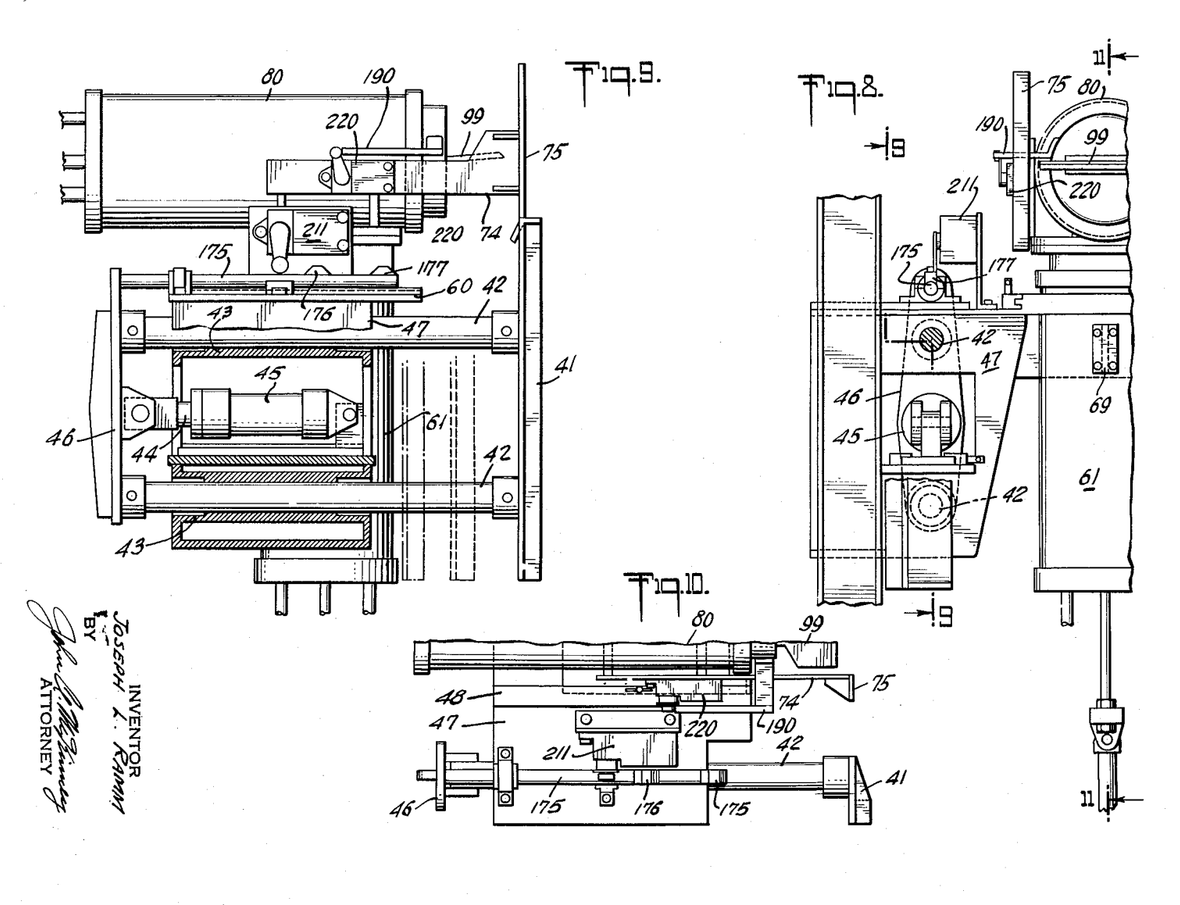
FIG. 8 is a side elevation showing the centering guides and metering cylinder.
FIG. 9 is a section taken on a plane passing through the line 9—9 of FIG. 8.
FIG. 10 is a partial plan view of the apparatus of FIG. 8.

A pair of right angular centering guides 41 are mounted above and cooperate with the stacking frame 25 for the proper placement of the singles. As viewed in FIG. 9, each centering guide 41 is connected to a pair of rods 42 moving through fixed bushings 43. The horizontal movement of the guide 41 is controlled by the piston 44 of the actuating cylinder 45 acting on the end plates 46 attached to the rods. Each centering guide assembly is mounted on a unit 47 that is independently adjustable in a horizontal direction. The unit 47 moves in the rails 48 suitably mounted in fixed supports 48a so that the initial position of the guides 41 may be varied to accommodate different sized shingles.

In operation, shingles are removed from the feed hopper 20 and placed on the stacking frame 25. The shingles are positioned on the stacking frame 25 so that the forward edges of the shingles abut the adjacent guides 41. The stacking frame 25 is above the carriage 30 so that the shingles may be placed thereon without injury to the hands of the operator. When the shingles are in proper position, the stacking frame 25 is lowered to deposit the shingles on the carriage 30. The centering guides 41 are then retracted by the piston 44 and the carriage 30 is moved to the other end of the rails 31 by the piston 37 through the drive 33—35.

Main elevator feed

The main elevator feed or ram consists of a vertical cylinder 50, securely mounted on the floor 51 of the pit 11, and a piston 52. Threaded onto the free end of the piston 52 is a support 53 to which is bolted the ram table 54. When the carriage 30 is in proper position, the ram table 54 is moved upwardly through the opening 39 to remove the shingles from the carriage. Depending from the ram table 54 is a plate 55 having a pair of bosses 56 and 57 that function to trip electrical limit switches during the vertical movement of the ram which is at first rapid and then metered. As the ram meters up, it feeds the shingles to a suction conveyor belt (to be later described) for delivery to the punch press. After a predetermined number of shingles have been fed, the ram trips an electrical limit switch to actuate the auxiliary feed.

The auxiliary feed

Figure 11:
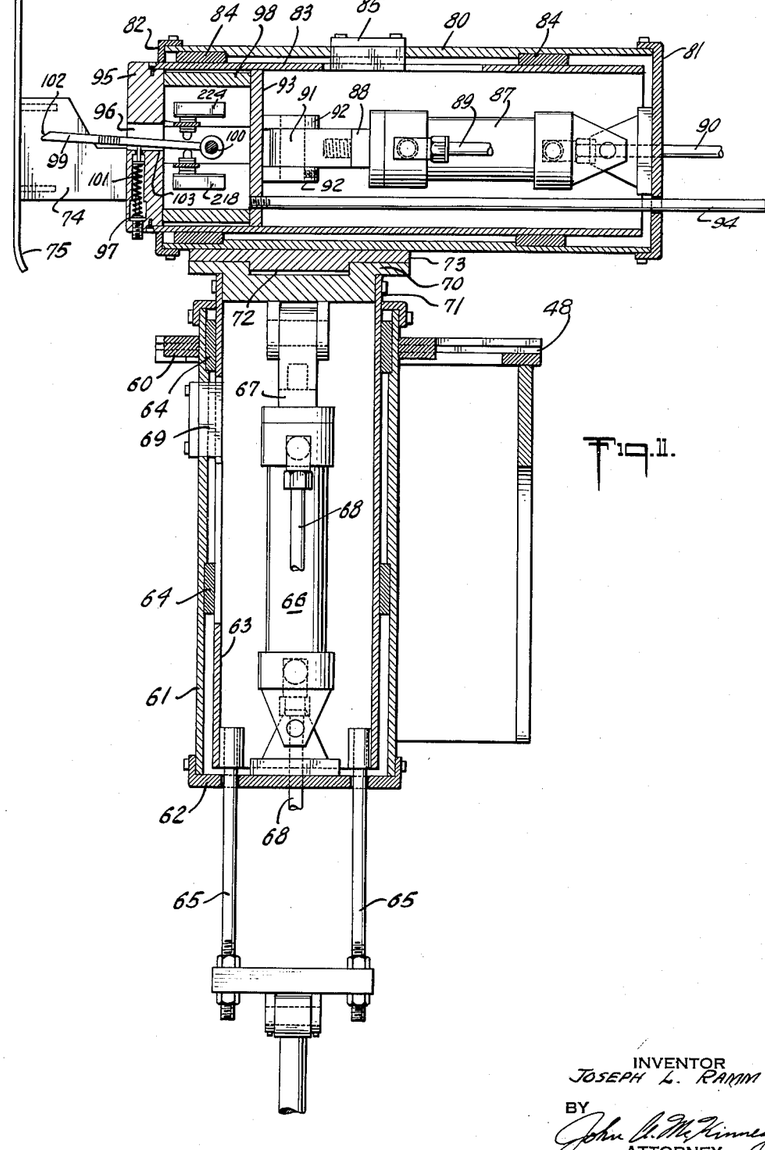
FIG. 11 is a sectional view taken on a plane passing through the line 11—11 of FIG. 8 on an enlarged scale.

As viewed in FIG. 11, the auxiliary feed consists of cooperating units located on opposite sides of the apparatus. Since the units are similar, only one of them will be described. Each unit is connected to a plate 60 attached to the unit 47 and adjusted therewith so that different sized shingles may be accommodated. A cylindrical housing 61 is secured to the plate 60 and is closed at one end by the cover 62. A cylindrical sleeve 63 is mounted for relative longitudinal movement in the housing 62 on a pair of bushings 64. Guide rods 65 extending through openings in the cover 62 and connected to the sleeve 63 prevent any rotation of the sleeve. Positioned inside the sleeve 63 there is a metering cylinder 66 and piston 67. The free end of the cylinder is attached to the cover 62 and is fed hydraulic fluid through the tubes 68. A key 69 limits movement of the sleeve 63. The piston 67 is connected to a flanged support 70 which is secured to the upper end 71 of the sleeve 63. The support 70 has a central longitudinal channel 72.

A base plate 73 is mounted on the support 70 and has a depending portion for mating engagement in the channel 72. At either end, the plate 73 is provided with upstanding and forwardly projecting arms 74 on the end of which is secured a vertical guide 75. The side lifting finger assemblies are positioned between the arms 74.

Each side lifting finger assembly consists of a cylindrical housing 80 secured to the base plate 73 and closed by attached covers 81 and 82. A cylindrical sleeve 83 is mounted for relative longitudinal movement on a pair of bushings 84 in the housing 80 through an opening in the cover 82. A block 85 fixed to the housing 80 and extending through a slot 86 in the sleeve 83 limits the movement of the sleeve. Positioned inside the sleeve 83, there is a lifting finger cylinder 87 and piston 88. The cylinder 87 is pivotally mounted on the cover 81 and has hydraulic supply tubes 89 and 90. The piston 88 is pivotally connected to a pin 91 mounted in a pair of depending ears 92 on a circular plate 93. A rod 94 threaded in the plate 93 and passing through an opening in the cover 81 prevents rotation of the plate 93. A cover 95 having a central rectangular opening 96 and a radial bore 97 is secured on one end of the sleeve 83. Attached to the plate 93 and located between the cover 95 and the plate 93, there is an electrical housing 98 containing limit switches 218 and 224. A lifting finger 99 is pivotally mounted on a pin 100 secured to the housing 98 and extends between the switches 218 and 224 and passes through the rectangular opening 96. The finger 99 is held in a normal position by an adjustably mounted spring 101 located in the bore 97.

When the ram table 54 has reached a predetermined point, an electrical limit switch is tripped to actuate the auxiliary feed. Fluid is pumped through the tube 90 to the cylinder 87 and pushes the piston 88 outward. This extends the sleeve 83 and associated assemblies so that the inclined end 102 of the lifting finger 99 moves under the stack of shingles. The weight of the shingles on the finger 99 closes switch 218 which actuates the metering cylinder 66. In lifting position, finger 99 rests on the edge 103 of the opening 96. The upward metered movement of the piston 67 raises sleeve 63 so that the entire assembly supported on the base 73 is raised and the shingles carried by the lifting fingers 99 are fed to the suction conveyor belt.

Vacuum feed assembly

The vacuum feed assembly is particularly shown in FIGS. 16–19. Channels 110 fixed to the top adjacent I-beams 10 support a rectangular frame 111 on which are mounted various mechanisms.

Figure 16:
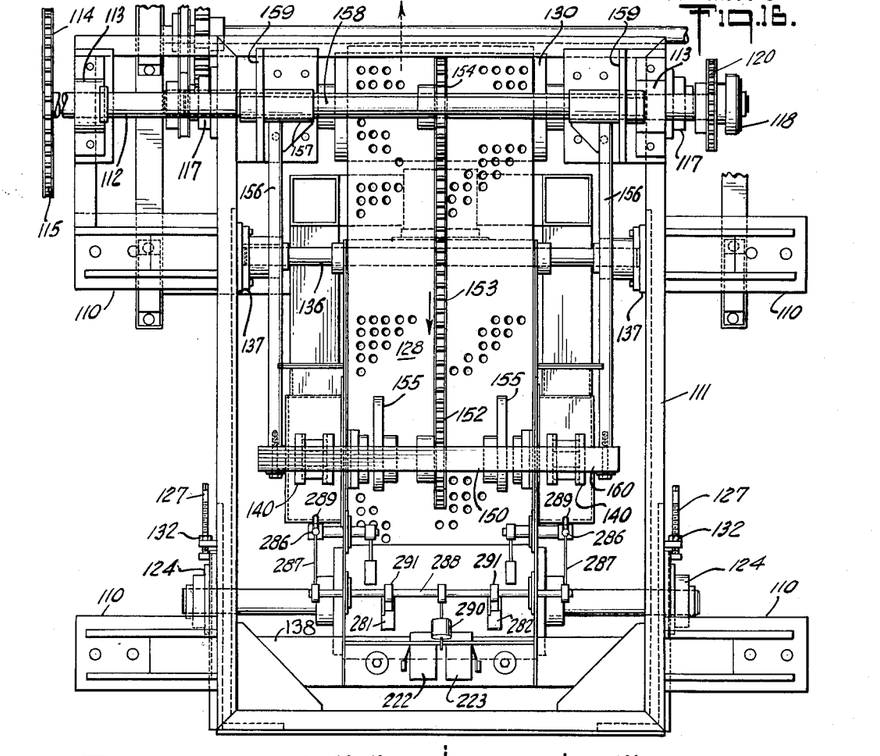
FIG. 16 is a top plan view of the vacuum belt assembly.
Figure 17:
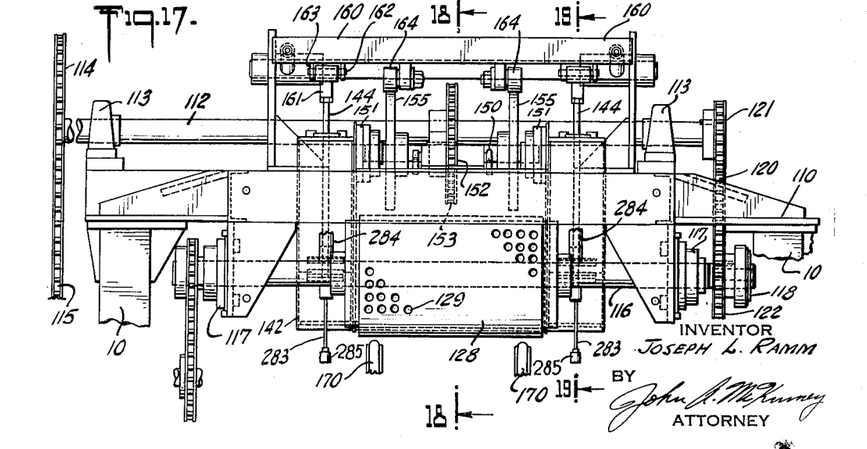
FIG. 17 is a front elevation of the vacuum belt assembly.
Figures 18, 19:
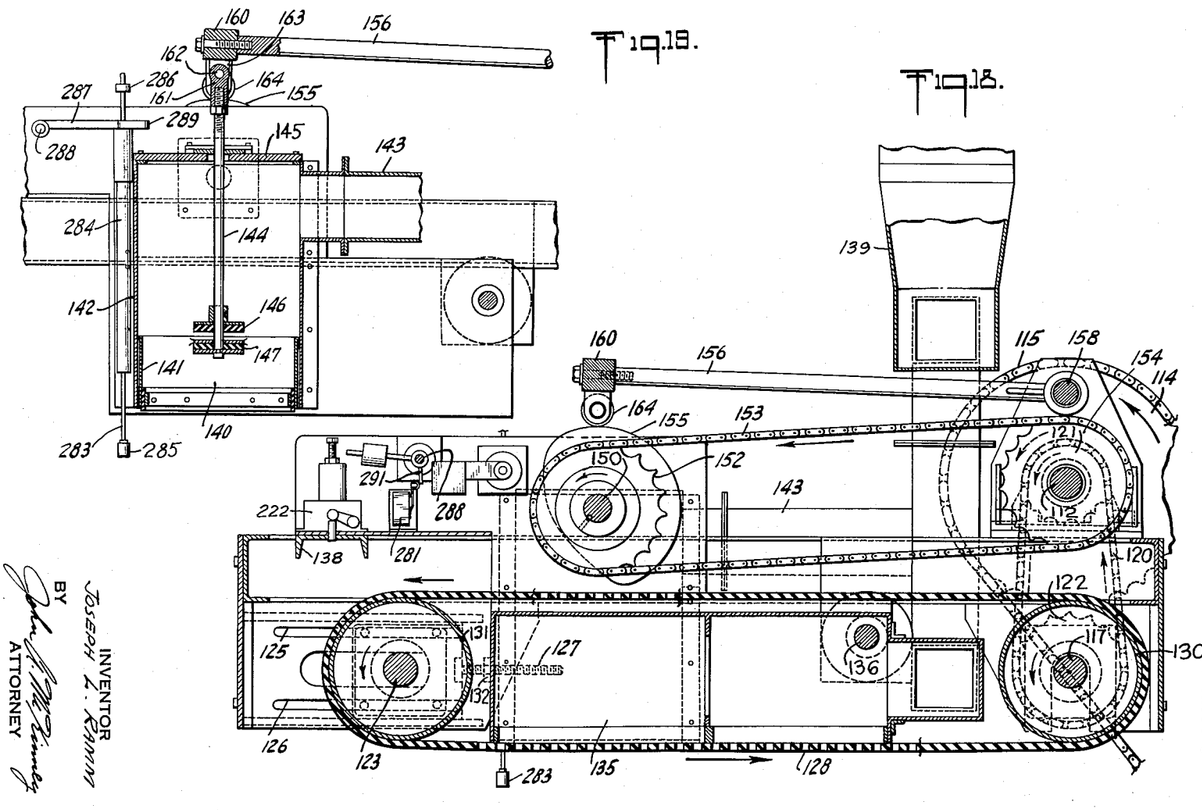
FIG. 18 is an enlarged sectional view taken on the plane passing through the line 18—18 of FIG. 17.
FIG. 19 is an enlarged sectional view taken on the plane passing through the line 19—19 of FIG. 17.

A main drive shaft 112 is journaled in bearings mounted in the pillow blocks 113. At one end of the shaft 112, there is a sprocket 114 rotated by a chain 115 connected to a main power source (not shown). Directly beneath the shaft 112, there is the conveyor belt drive shaft 116 journaled in bearings 117 mounted on the frame 111. The shaft 116 is rotated through a friction clutch 118 connected to the main drive shaft 112 through chain 120 and sprockets 121 and 122. The idler shaft 123 for the conveyor belt is journaled for rotation in bearings 124 adjustably mounted in slots 125 and 126 in the frame 11. The bearings 124 are adjusted by the attached and non-rotatable bolts 127. An endless belt 128 having perforations 129 is mounted for movement in the direction indicated by the arrows over cylindrical drums 130 and 131 fixed to the shafts 112 and 123 for rotation therewith. Proper tension on the belt 128 is obtained by rotating the nuts 132, rotatably mounted on the frame 111 but held against axial movement, to move the bolts 127 thereby adjusting the bearings 124.

Mounted between the horizontal reaches of the belt 128 is a vacuum box 135 which is secured at one end to a shaft 136 journaled in the bearings 137 attached to the frame 111. The lower reach of the belt 128 is contiguous to the lower edges of the box 135. At the other end, the vacuum box 135 rests on the ledge 138 so that the box 135 normally may rotate with the shaft 136 only in an upward direction. Fixed limit switches 222 and 223 are tripped by the upward movement of the vacuum box and function to retract the ram or auxiliary feed and to stop the apparatus. Ducts 139 suitably connect the box 135 to a vacuum creating source (not shown).

Adjacent one end of the box 135, there are a pair of vacuum shoes 140 mounted on each side of the box. Each vacuum shoe consists of a sleeve 141 mounted for relative vertical movement into and out of the housing 142 fixed to the box 135. A duct 143 connects each shoe to the vacuum creating source. The sleeve 141 is moved up and down by a rod 144 operating through an opening in the top wall 145 of the housing 142. The rod 144 moves through bushing 146 connected to the housing 142 and is attached to the sleeve 141 by mounting 147.

A shaft 150 is journaled in bearings 151 mounted on the housing 142. Fixed to the middle of the shaft 150 is a sprocket 152 rotated by the chain 153 which is driven by a sprocket 154 fixed to the main drive shaft 112. On either side of the sprocket 152, there is a cam 155 fixed to the shaft 150 for rotation therewith. Thus, the cams 155 are synchronized with the main drive shaft 112. A pair of rods 156 are pivotally connected by bushings 157 for rotation about pivot pin 158 fixedly mounted in the supporting brackets 159. The free ends of the rods 156 are joined by a bar 160. Each of the vacuum shoe rods 144 is pivotally connected by a bushing 161 to a pin 162 carried by the ears 163 depending from the bar 160, which also has a pair of rotatable cam followers 164 mounted to ears 165 and bearing against the cams 155.

In operation, the vacuum feed assembly functions to remove the top one of a stack of shingles and to place it on the conveyor belt 128 leading to the punch press (not shown). With the stack of shingles in proper position, the cam followers 164 allow the rods 144 under the influence of gravity to move the shoes 140 downward to contact the top shingle. The shoes 140 are then stroked vertically by the cams 155 to lift the top shingle into contact with the belt 128. As the shingle strikes the belt, it is peeled away from the sleeves 141 which continue their upward travel. The shingle is held against the belt 128 by the action of the vacuum box 135 through the perforations 129 and moves therewith until it passes from beneath the suction box 135. It is then deposited on the belts 170 to be moved to the punch press. Since the cams 155 operate in synchronization with the main drive, the vacuum feed assembly delivers shingles to the belts 170 as needed by the punch press.

Punch press feed

The belt conveyor means 15 consists of a base 171 secured to the I-beam 14. A shaft 172 is mounted for rotation in a pair of upstanding ears 173 attached to the base 171. Secured to the shaft 172 for rotation therewith are a pair of pulleys 174 spaced a predetermined distance apart. A second shaft 175 is mounted in the upstanding ears 176 and carries a pair of pulleys 177 for rotation therewith. At one end, the shaft 175 has a gear 178 secured thereto and in mesh with another gear 179. The gear 179 is mounted on the same shaft as sprocket 180 driven by another sprocket 181 attached to the shaft 116. A pair of endless belts 170 are threaded around the pulleys 174 and 177 and are spaced apart a distance equal to the width of the conveyor belt 128. The belts 170 are driven at the same speed and in the same direction as the conveyor belt 128 by the gear connection 178—179. The belts 170 function to receive a shingle from the conveyor belt 128 and to feed the shingle directly to the punch press.

*The electrical system*

The electrical system consists of a number of different types of limit switches that function to operate hydraulic supply valves which move various mechanisms of the apparatus.

Switch 211 is fixed to unit 47 for movement therewith. An arm 175 is connected to the end plates 46, as viewed in FIG. 9, and has switch operating bosses 176 and 177 thereon. The position of the left guide 41 determines the condition of the switch 211. In normal position with the guide 41 in the shingle loading or "in" position, the switch 211 is open. When the guide is moved to the "out" position, the switch is held closed by one of the bosses. Switch 211 is in series with switch 212.

Figure 13:
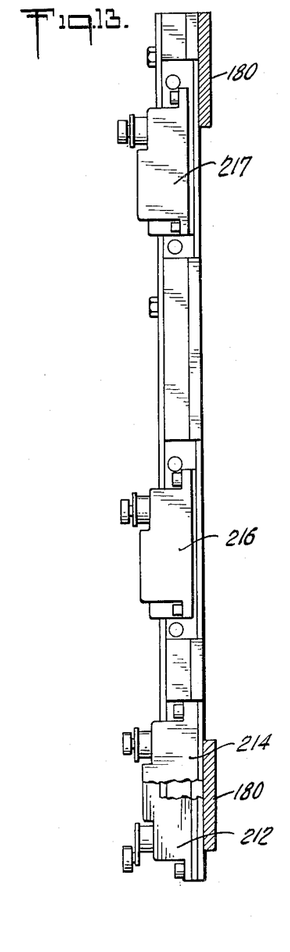
FIG. 13 is an enlarged side elevation showing the location of the limit switches.
Figure 14:
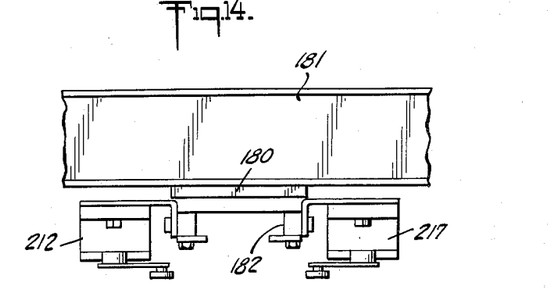
FIG. 14 is a top plan view of the apparatus of FIG. 13.
Figure 15:
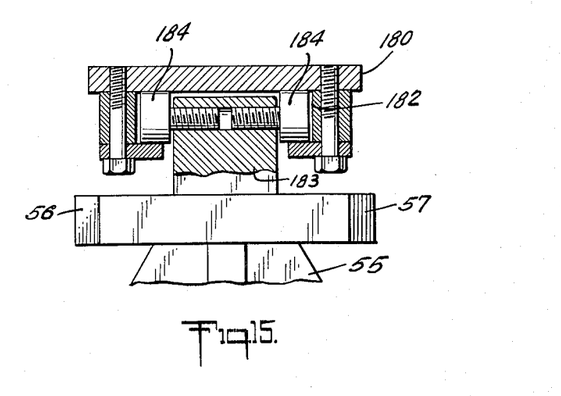
FIG. 15 is an enlarged view of a portion of FIG. 14.

A plurality of limit switches are mounted in position to be operated by the bosses 56 and 57 on the ram plate 55. As viewed in FIGS. 13–15, these switches are mounted on a vertical column 180 that is secured to a channel 181. The column 180 has a longitudinal T-shaped slot 182 in which rides an extension 183 of the plate 55 having guide bearings 184. This arrangement prevents rotation of the ram table 54 and properly positions bosses 56 and 57 to trip the switches. Switch 212 is located at the bottom of the column 180 and is normally held closed by the boss 56 when the ram is in the extreme position. When switch 211 is closed, switch 212 functions to move the carriage to the "in" position.

Switches 213 and 215 are mounted on the right guide rail 31 for the carriage (FIG. 7). A depending boss 186 on the carriage 30 trips switches 213 and 215. When the carriage 30 moves to the "out" position, switch 215 is momentarily tripped and functions to raise the stacking frame 25 and to move the side guides 41 to the "in" position. As the carriage 30 moves "in," switch 213 is actuated and this starts the ram on fast up.

Located above switch 212 on column 180 in a position to be tripped by the boss 57 is the switch 214 which when momentarily closed moves the carriage 30 back to the "out" position so that another load of shingles may be placed on the stacking frame 25. As the ram moves on the fast up, boss 57 momentarily closes switch 216 mounted on the column 180 which changes the ram speed from fast up to metering up. Switch 216 does not operate if switch 218 (to be described) is closed.

After a predetermined number of shingles have been fed, boss 57 trips switch 217 located on the column 180. This functions to move the side lifting fingers 99 in under the stack 188 of shingles after which the ram is retracted. The right side lifting finger 99, as viewed in FIG. 12, closes switch 218 which functions to cut limit switch 216 out of the circuit. Switch 220 is mounted on an arm 74 (FIG. 9) and is normally held in an open position by the lever 190 attached to the sleeve 83 of the left side lifting finger assembly. When the left side lifting finger 99 reaches the out position, switch 220 is closed to start the side elevator cylinders 66 metering up.

Figure 12:
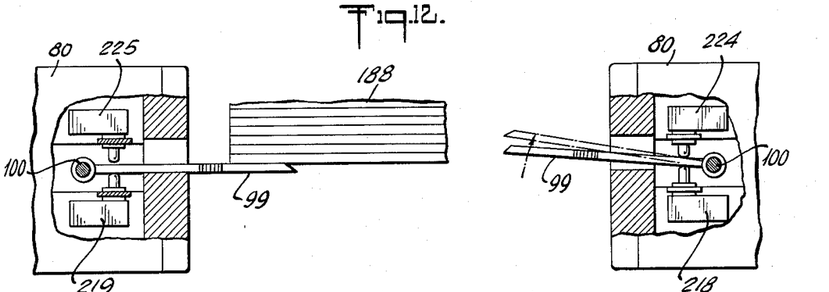
FIG. 12 is an enlarged fragmentary view of the lift fingers.

Switch 219, located in the left side lifting finger assembly, is tripped by a new stack of shingles coming up under the lifting finger 99 when in an extended or shingle supporting position, as viewed in FIG. 12. This switch functions to start the ram metering, to retract the side lifting finger assemblies and to open switch 220 through lever 190 and thereby retracting the side elevator assemblies. To prevent overtravel, a crank arm 192 operated by the side lifting cylinder sleeve 63 rotates shaft 193 to turn lever 194 which operates switch 221 just before the maximum up travel of the side elevator assembly. The crank assembly also serves as a mechanical linkage between the two side lifting cylinder sleeves assuring movement of both in the same plane. This moves the side lifting finger assembly out to operate switch 220 and retract the side elevator assemblies.

Emergency switches 222 and 223 are positioned above the vacuum box 135 and are tripped if the shingles being fed jam up against the conveyor belt. These switches open the hydraulic exhaust valves to retract the ram and side lifting assemblies and stop the apparatus. Emergency switches 224 and 225 operated by the side lifting finger 99 have the same result as switches 222 and 223.

*Hydraulic system*

Figure 20:
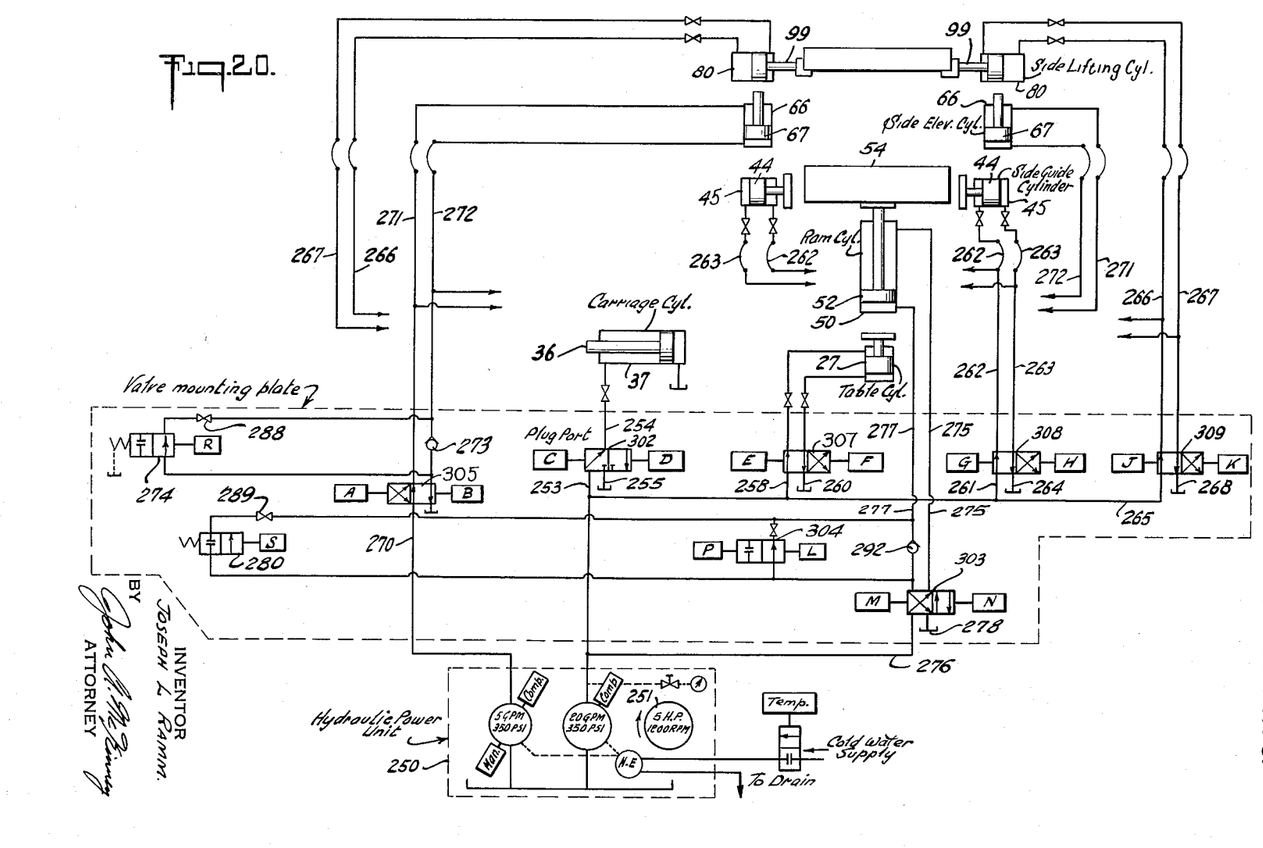
FIG. 20 is a schematic drawing of the hydraulic system.

The hydraulic system is illustrated in FIG. 20 wherein a schematic representation shows the type and operation of the hydraulic valves which position the various devices of the apparatus.

The hydraulic system comprises a plurality of solenoid valves actuated by the electrical limit switches explained above. In the system, a supply of hydraulic fluid under pressure is provided to the hydraulic valves so that the fluid may be properly directed to mechanically move the various pistons. A hydraulic power unit having a 12 g.p.m. and a 5 g.p.m. combination pump 250 is powered by a 5 H.P. motor 251. All of the valves are the usual commercial type, of solenoid valve activated by the limit switches described above. In the representation shown in FIG. 20, all the hydraulic lines are fixed with the valves having relative movement in a horizontal direction.

The carriage cylinder 37 is responsive to solenoid valve 302. To move the piston 36 within the cylinder 37, fluid is pumped through pressure line 253, side C of the valve 304 and line 254. When the piston 36 is retracted by the counterweight 38, valve 302 has been moved so that the side D is now in operative position and connects line 254 to the drain 255.

The table cylinder 27 is illustrated in the down position wherein side E of valve 307 connects the upper cylinder line 257 to the fluid pressure supply line 258 and the lower cylinder line 259 to the drain 260. When valve 307 is moved to the side F, the stacking frame 25 is raised since line 259 is connected to the fluid pressure line 258 and the upper cylinder line 257 is led to the drain 260.

Valve 308 is similar to valve 307 and functions to position the pistons 44 in the side guide cylinders 45. With side G in position, fluid moves through lines 261 and 262 to retract the cylinder while line 262 is connected to the drain 264. In the side H position, valve 308 connects fluid pressure line 261 to line 263 and line 262 to the drain 264 so that the side guides move inwardly.

Another four-way hydraulic valve 309 positions the side lifting finger assemblies. Through side J, valve 309 connects pressure supply line 265 to the piston operating line 266 and line 267 to drain 268 so that lifting fingers 99 are positioned under the stack of shingles. When the valve 309 is actuated by switch 219 to the K position, line 267 is connected to the pressure supply line 265 to retract the lifting finger assemblies.

The side elevator cylinder pistons 67 are positioned in cylinder 66 by valve 305. As illustrated in FIG. 20, side B of valve 305 connects the pressure supply line 270 with the cylinder lines 271 and the cylinder lines 272 to the drain to hold pistons 67 in the down position. When valve 305 moves to side A, fluid passes through lines 270 and 272 to raise the pistons 67. A check valve 273 in the line 272 meters the upward movement of the piston 67 through a control valve 274.

Operation of the ram is dependent upon valves 304 and 303. To raise the ram rapidly side L of valve 304 and side N of valve 303 are moved into position. To change the rise of said ram to a metered speed, valve 304 is actuated so that side P is in operative position. Upward movement of the ram is then regulated by control valve 280. To retract the ram, side M of valve 303 is moved into operative position and line 275 is connected to the pressure supply line 276 while line 277 is connected to drain.

The control valves 274 and 280 are operated by limit switches 281 and 282 mounted adjacent the vacuum feed assembly. A pair of rods 283 are mounted for vertical movement in housings 284 attached to the side walls of the vacuum shoe housings 142. A feeler 285 on the lower end of each rod 283 contacts the top of the stack of shingles. Secured to the upper end of each rod 283 is a collar 286. A lever 287 is attached at one end to a shaft 288 for rotation therewith and at the other end has a slot 289 encircling each rod 283 beneath the collar 286. The levers 287 are held against the collars 286 to follow the movement of the rods 283 by the counterweight 290 on the shaft 288. A pair of trip arms 291 secured to the shaft 288 operate the limit switches 281 and 282.

Limit switches 281 and 282 are normally open. In operation, the rods 283 contact the top of the stack of shingles being fed. If the stack is too low, the levers 287 are moved downwardly by the rods 283 to rotate the shaft 288 and close the limit switches 281 and 282 through the trip arms 291 and thus actuate the control valves 274 and 280 to by-pass check valves 273 and 292. The rods 283 are counterbalanced so that they will move with the top shingle as it is picked up by the vacuum feed shoes 140 and yet allow the top shingle to then move with the conveyor belt 128.

*Operation*

The operation of the apparatus is best illustrated in FIGS. 1–4 which show how a stack 300 of shingles progresses from the feed hopper 20 to the conveyor belt 170 which successively receives the top one of the stack of shingles.

The original procedure is to start the motors which control the operation of the apparatus. First the blower motor (NS) is started to supply vacuum for the boxes 135 and the shoes 140 and then, the press and take-off motor (NS) is started to provide the power for the rotation of the main drive shaft 112. Finally, the pump motor 251 is started for provision of hydraulic pressure for the solenoid valves. The pump motor, also, closes an interlocked contact (NS) that energizes the circuit for the limit switches, relays and solenoid valve coils. All controls are now prepared to perform their operations.

In the loading position, the stacking frame 25 extends above the carriage 30 so that shingles may be placed thereon without injury to the hands of the operator. The side guides 41 are in position adjacent the stacking frame 25 so that the shingles 300 may be placed in proper position on the frame 25. The operator takes a stack 300 of shingles from the hopper 20 and places them on the stacking frame 25. When properly loaded, the forward edges 301 of the shingles abut the right angular guides 41. The solenoid valve 307 is in the F position so that the piston 26 of the charging table cylinder 27 is fully extended. The operator presses the "Start-Guides Out" button (not shown) and the apparatus begins to function. Valve 308 is moved to the G position and hydraulic fluid under pressure flows through lines 361 and 262 to move the side guides 41 out. Also, solenoid valve 307 is energized to move to the E position and hydraulic fluid under pressure moves through lines 258 and 257 to retract piston 26 of the charging table cylinder 27. As the frame 25 passes below the carriage 30 through the opening 39, the shingles 300 are deposited on the carriage. When the left guide 41 reaches the extreme out position, it trips limit switch 211. This allows limit switch 212, held by the ram when in the extreme down position, to energize coil C of the solenoid valve 302 so that hydraulic fluid flows through lines 253 and 254 to retract the carriage piston 36 and move the carriage in over the ram table 54. As the carriage 30 reaches the in position, the boss 186 on its lower side trips limit switch 213 which energizes coil L of valve 304 and coil N of valve 303. This combination allows the ram table 54 to be moved up at the fast speed. With the ram going up fast, switch 214 is tripped by the boss 57 which energizes coil D and allows the carriage to be moved out by the counterweight 38 and the hydraulic fluid to be emptied from cylinder 37 through line 254 to the drain line 255. Opening 40 allows for passage of the ram cylinder 50 as the carriage moves out. Just before the carriage 30 reaches the out position, switch 215 is tripped by the boss 186. This energizes coil F to raise the stacking frame 25 by connecting line 259 to the fluid pressure line 258. Also, switch 215 energizes coil H to move the side guides 41 in so that another stack of shingles may be placed on the frame 25. As the ram continues its upward movement, it trips limit switch 216 energizing coil P of valve 304 and the ram is changed to a metered speed regulated by the control valve 280 through limit switch 281. The metered speed is dependent upon the rods 283 so that the top shingle of the stack is always at a predetermined height to be picked up by the vacuum shoes 140.

After a predetermined number of shingles, less than all, have been removed from the stack 300, boss 57 on the ram piston 52 trips switch 217 which energizes coil J to move the side lifting fingers 99 in under the stack. Switch 217 also energizes coil M of valve 303 to supply hydraulic fluid under pressure to line 275 from line 276 and moves the ram table 54 downwardly. The weight of the shingles on the left lifting finger 99 closes limit switch 220 which energizes coil A of valve 305 to feed hydraulic fluid under pressure through line 272 regulated by the control valve 274. This allows the side elevator cylinders 67 to raise the stack of shingles at the same metered speed as previously done by the ram cylinder 50 through the control valve 274 operated by the limit switch 282 through the rods 283.

With the stack 300 being metered up on the lifting fingers 99, a new stack 310 of shingles is placed on the frame 25. The "Start-Guides Out" button is pushed and the above process is repeated until limit switch 216 is reached.

Switch 218 is closed by the weight of the shingles on the lifting finger and functions to cut limit switch 216 from the circuit allowing the ram table 54 to continue on fast up. As the new stack 310 of shingles moves under the remaining ones of the old stack 300, limit switch 219 is actuated. This energizes coil P of valve 304 and starts the ram metering through the rods 283 and control valve 280. Also, coil K of valve 309 is energized to connect lines 267 to the pressure line 265 and retract the side lifting finger assemblies to deposit the remaining shingles on the new stack 310. As the left side lifting finger is retracted, switch 220 energizes coil B of valve 305 to lower the side elevator pistons 67. When the last shingle has been fed, switch 221 is tripped by the side elevator cylinder 66 through linkage 192—193 just before reaching a maximum up position. This energizes coil K to retract the side plates which actuate switch 220 to energize coil B and lower the side elevator pistons 67. Thus, the hydraulic and electrical systems combine to maintain the top one of a stack of shingles at a predetermined position to be picked up by the vacuum shoes 140.

The vacuum shoes 140 are moved up and down in a vertical plane by the rods 144 actuated by the cam followers 164 held by gravity against the cams 155. On each cycle of the cams 155, the rods 144 and the sleeves 141 of the shoes 140 move downward to contact the top shingles of the stack. The shingle is held by suction against the sleeve 141 which is then raised by the cams 155. The bottom surface of the sleeves 141 in their up position is above the conveyor belt 128. Therefore, as the shingle strikes the belt, the shoes continue upward leaving the shingle on the belt. The shingle, held against the conveyor belt by the vacuum box 135, moves with the belt until it passes from beneath the boxes 135 and is then deposited on the belts 170 to be moved to the punch press. The metered speed of the ram is related with the movement of the vacuum shoes which are synchronized with the operating speed of the punch press. Thus, shingles are picked up by the shoes 140 as needed by the punch press.

Having thus described the invention in rather full detail, it will be understood that these details need not be strictly adhered to and that various changes and modifications may suggest themselves to one skilled in the art, all falling within the scope of the invention as defined by the subjoined claims. It is to be appreciated that although the mechanism is described in relation to a shingle feeding apparatus that any type of sheet feeding is meant to be included within the scope of the invention.

What I claim is:

1. A sheet feeding apparatus comprising a loading station having a carriage for receiving a first plurality of sheets, a main elevator, means for moving said carriage from said loading station to said main elevator, means for raising said elevator, said elevator passing through said carriage so that said first plurality of sheets are deposited on said elevator, auxiliary means onto which said sheets are transferred from said main elevator at a predetermined position, means for raising said auxiliary means at a metered rate so that the top one of said first plurality of sheets is in position to be acted upon, a conveyor, means for removing the top one of said first plurality of sheets and for transferring said top one sheet to said conveyor, means for positioning a second plurality of sheets below the remaining ones of said first plurality of sheets with the lowermost sheet of said first plurality of sheets in contiguous relationship with the uppermost sheet of said second plurality of sheets, and means for removing said auxiliary means from a position beneath said lowermost sheet of said first plurality of sheets while said second plurality of sheets and the remaining ones of said first plurality of sheets are supported by said main elevator.

2. A sheet feeding apparatus comprising a main elevator, means for depositing a first plurality of sheets on said main elevator, means for raising said main elevator at a metered rate of speed, auxiliary means onto which said first plurality of sheets are transferred from said main elevator at a predetermined position, means for raising said auxiliary means at a metered rate so that the top one of said first plurality of sheets is in position to be acted upon, a conveyor, means for removing the top one of said first plurality of sheets and for transferring said top one sheet to said conveyor, means for positioning a second plurality of sheets below the remaining ones on said first plurality of sheets with the lowermost sheet of said first plurality of sheets in contiguous relationship with the uppermost sheet of said second plurality of sheets so that the feeding of sheets to said conveyor is not interrupted, and means for removing said auxiliary means from a position beneath said lowermost sheet of said first plurality of sheets while said second plurality of sheets and the remaining ones of said first plurality of sheets are supported by said main elevator.

3. A sheet feeding apparatus comprising a movable stacking frame on which sheets are initially positioned, a pair of movable guides adjacent said stacking frame and cooperating therewith to position said sheets, a carriage having a central opening through which moves said stacking frame, means positioning said stacking frame so that said frame normally lies in a plane above said carriage, means for moving said stacking frame so that said sheets are deposited on said carriage, a main elevator for receiving the sheets from said carriage, a pair of tracks between said main elevator and said stacking frame, said carriage being adapted for movement over said tracks, means controlled by the position of said elevator for moving said carriage said tracks between said stacking frame and said main elevator, means for raising said elevator, said elevator passing through said carriage so that said sheets are deposited on said elevator, auxiliary means onto which said sheets are transferred from said main elevator at a predetermined position, means for raising said auxiliary means at a metered rate so that the top one of said sheets is in position to be acted upon, a conveyor, means for removing the top one of said sheets and for transferring said top one sheet to said conveyor, means for positioning a second plurality of sheets below the remaining ones on said first plurality of sheets with the lowermost sheet of said first plurality of sheets in contiguous relation to the uppermost sheet of said second plurality of sheets so that the feeding of sheets to said conveyor is not interrupted, and means for removing said auxiliary means from a position beneath said lowermost sheet of said first plurality of sheets while said second plurality of sheets and the remaining ones of said first plurality of sheets are supported by said main elevator.

4. A sheet feeding apparatus comprising a movable stacking frame on which a first plurality of sheets are initially positioned, a pair of movable guides adjacent said stacking frame to receive the forward edges of said first plurality of sheets so that said sheets will be properly positioned on said stacking frame, a carriage having an opening therein through which said stacking frame moves, means actuating said stacking frame to deposit said sheets on said carriage, a main elevator, a pair of tracks between said main elevator and said stacking frame, said carriage being adapted for movement over said tracks, means moving said carriage over said tracks, a pair of hydraulic valves for raising said elevator at a rapid and a metered speed to remove said sheets from said carriage, a pair of lifting fingers onto which said sheets are transferred from said elevator, means moving said lifting fingers under said sheets on said elevator, means raising said lifting fingers at a metered speed, means retracting said elevator so that a second plurality of sheets may be placed thereon, a vacuum box, said vacuum box being responsive to excessive movement of said sheets to stop all movement of said elevator and said lifting fingers, a perforated endless conveyor belt, means mounting said conveyor belt for movement over said vacuum box, a housing mounted on each longitudinal side of said box, means connecting said housings to a source of vacuum, a sleeve mounted in each of said housings, means moving said sleeve into and out of said housing so that said sleeve may contact and pick up a sheet, and means mounting said housing in a plane above the plane of said conveyor belt so that, as said sleeves move back into said housings, the sheet carried by said sleeves will be deposited on said conveyor belt.

5. In a sheet feeding apparatus, a loading platform comprising a movable stacking frame on which sheets are initially positioned, a pair of movable guides adjacent said stacking frame and cooperating therewith to position said sheets, a carriage having a central opening through which moves said stacking frame, means positioning said stacking frame so that said frame normally lies in a plane above said carriage, means for moving said stacking frame so that said sheets are deposited on said carriage, a main elevator for receiving the sheets from said carriage, a pair of tracks between said main elevator and said stacking frame, said carriage being adapted for movement over said tracks, means controlled by the position of said elevator for moving said carriage over said tracks between said stacking frame and said main elevator, and means for transferring said sheets from said carriage to said main elevator.

6. In a sheet feeding apparatus, means for positioning a plurality of sheets to be fed to a conveyor comprising a main elevator, means for depositing a first plurality of sheets on said main elevator, means for moving said elevator at a relatively rapid rate of speed, means at a predetermined position for changing said main elevator from a rapid to a metered rate of speed, auxiliary means onto which said first plurality of sheets are transferred from said main elevator, means for raising said auxiliary means at a metered rate of speed so that the top one of said first plurality of sheets is in position to be acted upon, means for lowering said main elevator, a second plurality of sheets deposited on said main elevator, and means for raising said main elevator and positioning said second plurality of sheets so that the uppermost sheet of said second plurality of sheets is in contiguous relationship with the lowermost sheet of said first plurality of sheets, and means for removing said auxiliary means from a position beneath said lowermost sheet of said first plurality of sheets while said second plurality of sheets and the remaining ones of said first plurality of sheets are supported by said main elevator.

7. Apparatus as in claim 6 wherein said means for raising said main elevator and said auxiliary means comprises hydraulically operated pistons.

8. Apparatus as in claim 6 wherein said auxiliary means comprises a pair of lifting fingers, said lifting fingers moving into and out of operating condition in a direction substantially perpendicular to the direction of movement of said main elevator, means for moving said lifting fingers into a position beneath said first plurality of sheets, and means for moving said lifting fingers from said position beneath said first plurality of sheets.

9. Apparatus as in claim 8 and further comprising means for preventing the excessive raising of said first plurality of sheets.

10. In a sheet feeding apparatus a vacuum feed assembly comprising a vacuum box having a face portion between a pair of sides, a perforated endless conveyor belt, means mounting said conveyor belt for movement contiguous to said face portion of said vacuum box, a housing mounted on each side of said vacuum box, means connecting said housings to a source of vacuum, a sleeve mounted in each of said housings, said sleeves being connected to said source of vacuum, means for moving said sleeves into and out of said housing so that said sleeves may contact and pick up a sheet, said housings lying in a horizontal plane above the plane of said conveyor belt so that, as the sleeves move back into said housings, the sheet carried by said sleeves will be deposited on said conveyor belt.

11. Apparatus as in claim 10 wherein said means for moving said sleeves comprises a rotatable shaft, a pair of cams mounted on said shaft for rotation therewith, a rod attached to each of said sleeves, a cam follower on each of said rods and means for synchronizing the rotation of said shaft with a desired further operation.

References Cited in the file of this patent

UNITED STATES PATENTS

| | | |
|---|---|---|
| 419,014 | Groth | Jan. 7, 1890 |
| 665,840 | Salmon | Jan. 8, 1901 |
| 1,061,526 | Cortissoz | May 13, 1913 |
| 1,077,400 | Droitcour | Nov. 4, 1913 |
| 1,085,792 | Boden | Feb. 3, 1914 |
| 1,442,718 | Free | Jan. 16, 1923 |
| 1,465,959 | Winter | Aug. 28, 1923 |
| 1,465,960 | Winter | Aug. 28, 1923 |
| 2,074,330 | Grover | Mar. 23, 1937 |
| 2,192,068 | Buttner | Feb. 27, 1940 |
| 2,247,466 | Baker et al. | July 1, 1941 |
| 2,530,670 | Von Hofe | Nov. 21, 1950 |
| 2,548,767 | Brest | Apr. 10, 1951 |
| 2,595,015 | Sparks | Apr. 29, 1952 |
| 2,667,982 | Evans | Feb. 2, 1954 |
| 2,733,920 | Von Hofe et al. | Feb. 7, 1956 |
| 2,772,880 | Garrett | Dec. 4, 1956 |
| 2,793,771 | Ochs | May 28, 1957 |
| 2,813,637 | Perry et al. | Nov. 19, 1957 |

UNITED STATES PATENT OFFICE

CERTIFICATE OF CORRECTION

Patent No. 2,989,306             June 20, 1961

Joseph L. Ramm

It is hereby certified that error appears in the above numbered patent requiring correction and that the said Letters Patent should read as corrected below.

Column 1, before line 9, insert -- Feeding apparatus --, as an italicized heading; column 1, line 14, for "single" read -- shingle --; column 2, line 31, for "singles" read -- shingles --.

Signed and sealed this 21st day of November 1961.

(SEAL)
Attest:

ERNEST W. SWIDER
Attesting Officer

DAVID L. LADD
Commissioner of Patents

USCOMM-DC